United States Patent [19]

Kita et al.

[11] Patent Number: 5,317,610
[45] Date of Patent: May 31, 1994

[54] DEVICE FOR THERMAL ELECTRIC AND NUCLEAR POWER PLANTS

[75] Inventors: Isamu Kita; Masayuki Kobashi; Susumu Tabuchi; Yoshiyuki Doi; Noboru Nakamura; Managu Ishihara; Koji Arioka; Isamu Kayano, all of Takasago, Japan

[73] Assignee: Mitsubishi Jukogyo Kabushiki Kaisha, Tokyo, Japan

[21] Appl. No.: 853,050

[22] Filed: Mar. 18, 1992

[30] Foreign Application Priority Data

Mar. 26, 1991 [JP] Japan .................. 3-61543

[51] Int. Cl.⁵ .............................. G21C 3/00
[52] U.S. Cl. ...................... 376/414; 376/305; 427/367
[58] Field of Search ........... 376/305, 306, 414, 415; 428/563; 427/367

[56] References Cited

U.S. PATENT DOCUMENTS

| | | | |
|---|---|---|---|
| 4,188,458 | 2/1990 | Hugosson et al. | 428/556 |
| 4,376,753 | 3/1983 | Lucas | 376/305 |
| 4,828,790 | 5/1989 | Honda et al. | 376/306 |
| 4,988,538 | 1/1991 | Horvei et al. | 427/53.1 |
| 5,057,340 | 10/1991 | Iyer et al. | 427/367 |
| 5,135,709 | 8/1992 | Andersen et al. | 376/305 |
| 5,151,308 | 9/1992 | Moskowitz et al. | 428/35.8 |

FOREIGN PATENT DOCUMENTS 0246003 11/1987 European Pat. Off.
52488 3/1983 Japan.

OTHER PUBLICATIONS

Worlds Patents Index Latest, Section Ch, Week 9026, Derwent Publications Ltd., London, GB; Class M. AN 90-197022 & JP-A-2 129 367, May 17, 1990.
World Patents Index Latest, Section Ch, Week 8430, Derwent Publications Ltd., London, GB; Class M, AN 84-185565 & JP-A-59 104 498, Jun. 16, 1984.

Primary Examiner—Donald P. Walsh
Assistant Examiner—Meena Chelliah
Attorney, Agent, or Firm—Jacobson, Price, Holman & Stern

[57] ABSTRACT

For the purpose of preventing reductions of wall thickness due to erosion-corrosion in parts (2, 3, 7) of a system made of carbon steel, and which constitute a wet steam system, a feedwater and condensate system, and a drain system of a thermal or nuclear power plant, a coating (17) of metal or ceramic which is chemically stable against a fluid flowing in the systems is formed by spraying on the surface of the devices which are exposed to the fluid.

7 Claims, 6 Drawing Sheets

F I G. 2
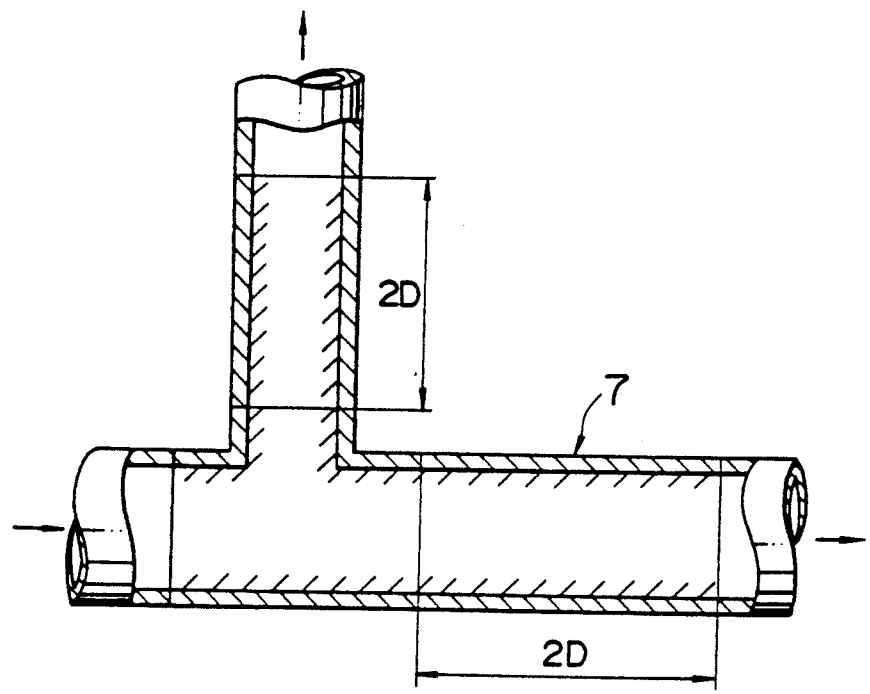
F I G. 3
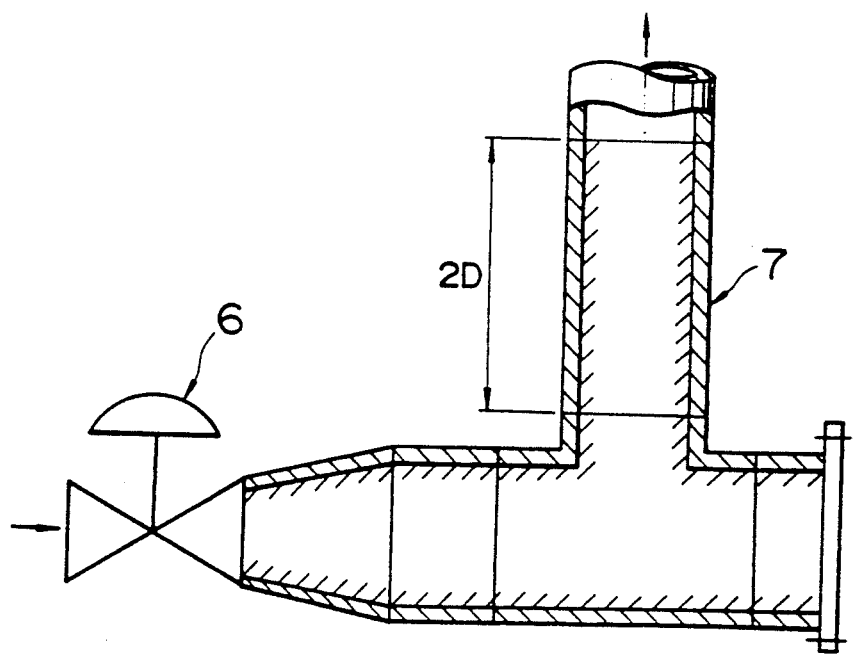

DEVICE FOR THERMAL ELECTRIC AND NUCLEAR POWER PLANTS

BACKGROUND OF THE INVENTION

The present invention relates to a device, such as pipes and various valves used with such pipes, which is made of carbon steel and constitutes the wet steam system, the feedwater and condensate system, and the drain system in thermal and nuclear power plants and which is protected from reduction of its wall thickness due to erosion-corrosion, a special and rapid form of damage to metal parts.

Carbon steel, such as forged steel and cast steel, is widely used as a material suitable for compositional parts, such as piping and various valves including gate valves, globe valves and check valves, used in the wet steam system, feedwater and the condensate system and the drain system of a thermal or nuclear power plant.

When these parts are made of carbon steel and exposed to a flow of a fluid, erosion-corrosion occurs at the surface on which the flow touches the parts. Because such power plants tend to be operated for longer periods of time, the thickness of part walls may reduce to such an extent as to cause various problems.

Therefore, the devices used in the wet steam system, the feedwater and condensate system and the drain system of a thermal or nuclear power plant have to be regularly overhauled and inspected to confirm that their wall thickness has not, due to erosion-corrosion, progressively reduced and no interference with the operation of the plant would occur.

If such development of reduced thickness appears to possibly exceed the allowable design limit, portions with developing reduced thickness are overlaid by welding, or affected parts are replaced.

Also, when the progress of thickness reduction is fast and incidental repairs by the overlaying or by the replacement of parts are frequently needed, these parts are generally produced anew using a CrMo steel or an austenitic stainless steel which has higher resistance against erosion-corrosion than carbon steel.

Here, the devices made of carbon steel constituting the wet steam system, the feedwater and condensate system and the drain system of a thermal or nuclear power plant amount to a voluminous quantity; therefore, it is very expensive to inspect each device regularly with UT (ultrasonic testing) and repair thickness-reduced portions by overlaying or replacing affected parts.

Also, if each device is to be made of austenitic stainless steel having a higher erosion-corrosion resistance than carbon steel, the cost of material would be several times as much as that of carbon steel, and therefore is uneconomical.

SUMMARY OF THE INVENTION

In view of the state of the art described above, it is an object of the present invention to provide a device for thermal and nuclear power plants which is protected from reduction of wall thickness caused by erosion-corrosion.

For achieving this object, the present invention provides:

1) a device for thermal or nuclear power plants which constitutes a wet steam system, a feedwater and condensate system, or a drain system of a thermal or nuclear power plant and which is exposed to a fluid flowing inside these systems, which device is characterized in that a coating of a metal or a ceramic which is chemically stable against the fluid flowing through the device and which functions as resistance against the efflux of $Fe^{2+}$, or a boundary film is formed on a parent metal of the device, so as to prevent the erosion-corrosion of the device;

2) a device for a thermal or nuclear power plant according to 1) above which is characterized in that the above-mentioned coating consists of a lower layer coating made of Ni—Cr and an upper layer coating made of WC (tungsten carbide) and Ni—Cr, each formed by atmospheric plasma thermal spraying;

3) a device for a thermal or nuclear power plant according to 1) above which is characterized in that the above-mentioned coating is made of a single layer of WC and Co, or WC, Ni and Cr formed by jet kote spraying which belongs to the high energy gas spray coating method; and 4) a device for a thermal or nuclear power plant according to the item 1) above which is characterized in that the above-mentioned coating is made of a single layer of austenitic stainless steel formed by diamond jet spraying which belongs to the high energy gas spray coating method.

BRIEF DESCRIPTION OF THE DRAWINGS

The invention will now be described in detail with reference to the accompanying drawings wherein:

FIG. 2 is a cross-sectional view of an embodiment in which the present invention is applied to a branch pipe;

FIG. 3 is a cross-sectional view of an embodiment in which the present invention is applied to a pipe disposed on the downstream side of a control valve;

In the present invention, the phrase "device for a thermal or nuclear power plant" signifies, for example, a pipe, a valve casing, a valve seat, and a valve element of a gate valve, a globe valve and a check valve which is used in a wet steam system, a feedwater and condensate system, and a drain system in nuclear and thermal power plants.

Next, the operation of the present invention will be described with reference to FIGS. 7 through 9.

Figure 7:
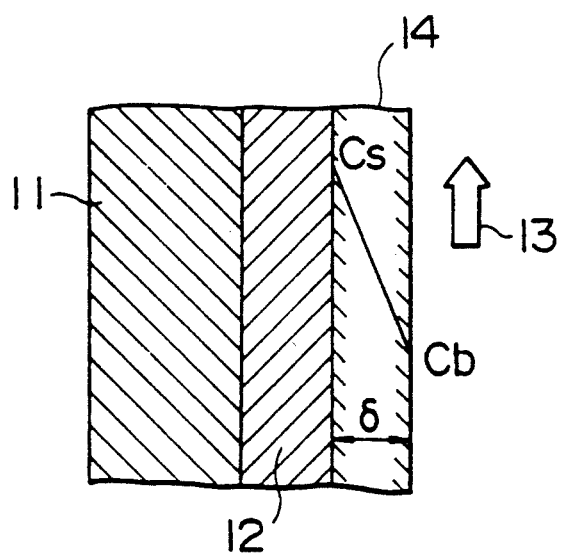
FIG. 7 is a cross-sectional view showing the mechanism of erosion-corrosion.

FIG. 7 is a view showing the mechanism of erosion-corrosion which occurs inside various devices used in the wet steam, feedwater and condensate, and drain systems of a thermal or nuclear power plant. In the figures, Cs and Cb denote the $Fe^{2+}$ ion concentration at respective positions in a boundary film, and $\delta$ denotes the thickness of the boundary film.

When deaerated pure water used in a power plant flows on a surface of the metal 11, such as carbon steel, which contains Fe as its major component, a film 12 of $Fe_3O_4$ is produced on the metal surface due to the oxidation of Fe, and further a laminar film 14 occurs between the film 12 of $Fe_3O_4$ and the flow 13 of the deaerated pure water. There, reactions take place according to the following reaction equation:

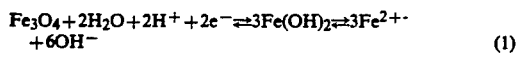

$$Fe_3O_4 + 2H_2O + 2H^+ + 2e^- \rightleftharpoons 3Fe(OH)_2 \rightleftharpoons 3Fe^{2+} + 6OH^- \quad (1)$$

In this chemical reaction equation (1), the reactions which proceed to the right represent the efflux of $Fe^{2+}$ into the deaerated pure water according to the dissolution of $Fe_3O_4$ by reduction, and the reactions toward the left show the deposition of $Fe_3O_4$.

When the deaerated pure water flows, the reactions toward the right in these reaction equations, i.e., the efflux of $Fe^{2+}$, tend to be accelerated. If $Fe^{2+}$ is released into the deaerated pure water due to the reactions toward the right and the film of $Fe_3O_4$ is washed away, then new $Fe_3O_4$ is produced by the oxidation of Fe and the film is complemented.

This phenomenon in which metal is lost with time due to the repetition of a combination of chemical and physical effects described above is called erosion-corrosion.

If we regard the loss of the metal due to erosion-corrosion as a flow of $Fe^{2+}$ caused by the reduction and dissolution of $Fe_3O_4$ in the laminar film, its rate may be given by the following equations.

$$dm/dt = K(Cs - Cb)$$

$$K = D/\delta$$

wherein $dm/dt$ represents the rate of $Fe^{2+}$ moving into the deaerated pure water, K a material transfer coefficient, Cs and Cb the $Fe^{2+}$ ion concentrations at the surface of the $Fe_3O_4$ layer and in the laminar film, respectively, D the diffusion coefficient of $Fe^{2+}$ ions in the laminar film, and the $\delta$ thickness of the laminar film.

For reducing the rate of loss of the metal due to the erosion-corrosion, it is effective to reduce the $Fe^{2+}$ ion concentration Cs at the surface of the $Fe_3O_4$ layer in the above equation or increase the thickness $\delta$ of the laminar film.

Figure 8:
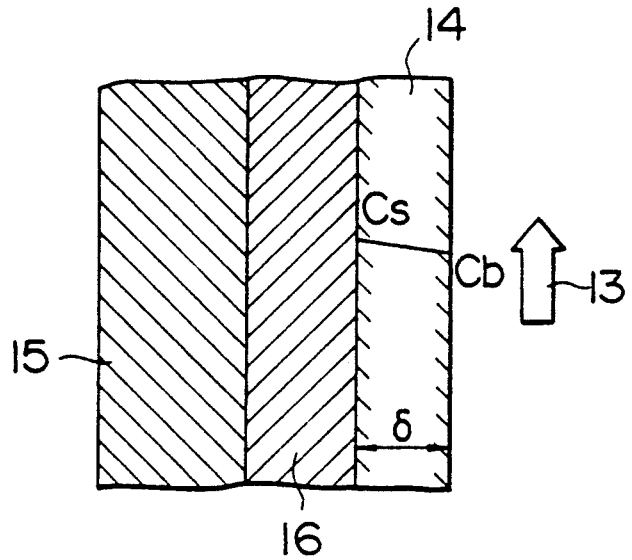
FIG. 8 is a view similar to FIG. 7 of operation of a preventive countermeasure against erosion-corrosion in accordance with related prior art.

If the former approach is to be adopted, a film layer 16 which is in a passive state may be formed in place of the film of $Fe_3O_4$ on the surface of the metal by adding Cr or the like to the metal as shown in FIG. 8, so as to prevent the chemical reactions described above from occurring. Namely, as described in the section of related art statement, it is usual to change the material of the parts subject to erosion-corrosion from carbon steel to austenitic stainless steel 15 having higher erosion-corrosion resistance. However, also as described in the same section, it is uneconomical to use austenitic stainless steel because the cost of material becomes several times as much as that of carbon steel.

Figure 9:
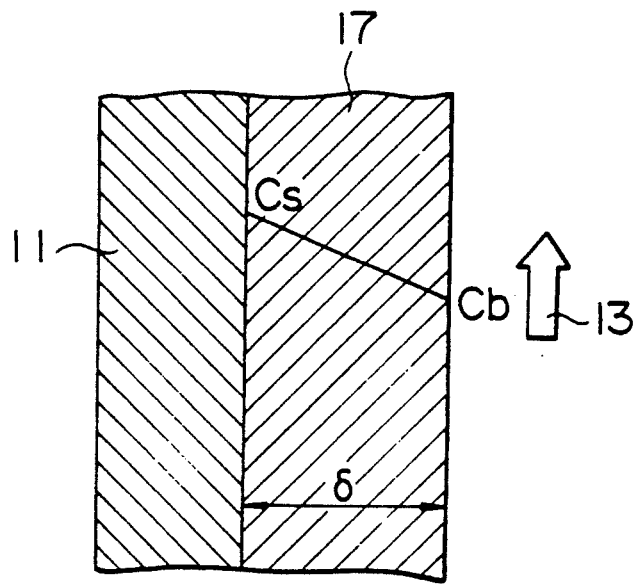
FIG. 9 is a view similar to FIG. 7 of operation of a preventive countermeasure against erosion-corrosion in accordance with the present invention.

On the other hand, if the latter approach is to be adopted, because it is difficult to control the thickness of the laminar film, a film layer 17 of a metal containing an element other than Fe as a major component or of a ceramic is formed on the metal surface 11 and used as resistance against the efflux of $Fe^{2+}$ or as a boundary film replacing the laminar film 14 as shown in FIG. 9. Namely, according to the present invention, it is found to be useful to form a film layer or coating 17 of a metal or a ceramic which is chemically stable against the fluid flowing in the system on the surface exposed to the flow.

Further, according to the present invention, the effect of the former approach can be achieved at the same time by adding Cr or the like to the major component of the metal film which is chemically stable against the fluid flowing in the system.

The kinds of metals or ceramics that can be used in the present invention are as shown below. Coatings of these materials are all confirmed to be chemically stable against deaerated pure water through immersion testing using deaerated pure water, and also confirmed by a heat cycle test to be durable under hot/cold cycles which occur during the starting and stopping operations of an electric power plant.

Metals and ceramics that can be used in the present invention will now be described.

A) A lower layer coating of Ni—Cr and an upper layer coating of WC and Ni—Cr [WC+(Ni—Cr)] (atmospheric plasma thermal spraying).

For the lower layer coating of Ni—Cr, a coating with a composition of Ni:Cr=80:20 is preferable as an under layer because it is easy to melt upon heating during the thermal spraying and with which sufficient bonding strength is obtained through fusion with the parent metal. For the upper layer coating of WC+(Ni—Cr), WC is used because of its excellent corrosion-resistant and erosion-resistant properties and Ni—Cr is added as an intergranular bonding material to help bonding because WC is hard to melt. Generally, a composition in the vicinity of WC:Ni—Cr=1:2 is preferable because of its high strength.

Also, when providing the lower and upper layer coatings, it is preferable to place a Ni—Cr lower layer coating whose thickness is about a third of the total thickness of the entire coating on the surface of the parent metal and a Ni—Cr coating which contains WC on the lower layer coating, so that sufficient bonding strength to the parent metal can be obtained. According to this, strong bonding is obtained between the parent metal and the lower layer coating and between the lower and upper layer coatings, and in particular, the corrosion and erosion resistant property which WC in the upper layer coating has against fluid can be utilized. Namely, the optimum thickness ratio of the lower layer coating to the upper layer coating is approximately 1:2.

B) A single layer coating of WC and Co [WC+Co] or WC and Ni—Cr [WC+(Ni—Cr)1 (jet kote thermal spraying).

Because WC does not easily melt upon heating during thermal spraying, Co or Ni—Cr is added as an intergranular bonding material. Because thermal spraying is performed by jet kote thermal spraying which can remarkably improve melting rate of WC as compared with atmospheric plasma thermal spraying, only a small amount of Co or Ni—Cr is needed to mix into WC and a composition of 88WC+12Co or 88WC+12(Ni—Cr) is preferred.

The jet kote thermal spraying belongs to the high energy gas thermal spray coating method and is powder thermal spraying which can produce a very sharp and high density coating by making use of an ultrasupersonic jet of combustion gas having a velocity of about Mach 5.

C) Austenitic stainless steel (diamond jet thermal spraying).

In this case, the spraying of an austenitic stainless steel having a composition by weight percent of 10 to 14% Ni, 16 to 18% Cr, 2 to 3% Mo, and balance Fe, which corresponds to SUS316, is performed by means of so-called diamond jet thermal spraying which is one of the high energy gas thermal spraying methods.

The diamond jet thermal spraying is a spraying method for producing a coating which is not porous and has a high density using high kinetic energy, and this method also allows control over the amount of heat, providing high bonding strength and a superb finished surface.

According to the present invention, reductions of wall thickness due to erosion-corrosion occurring in devices and parts which are made of carbon steel, such as piping and various kinds of valves, and which are used in the wet steam system, the feedwater and condensate system and the drain system of thermal or nuclear power plants can be prevented at low costs.

Figure 1:
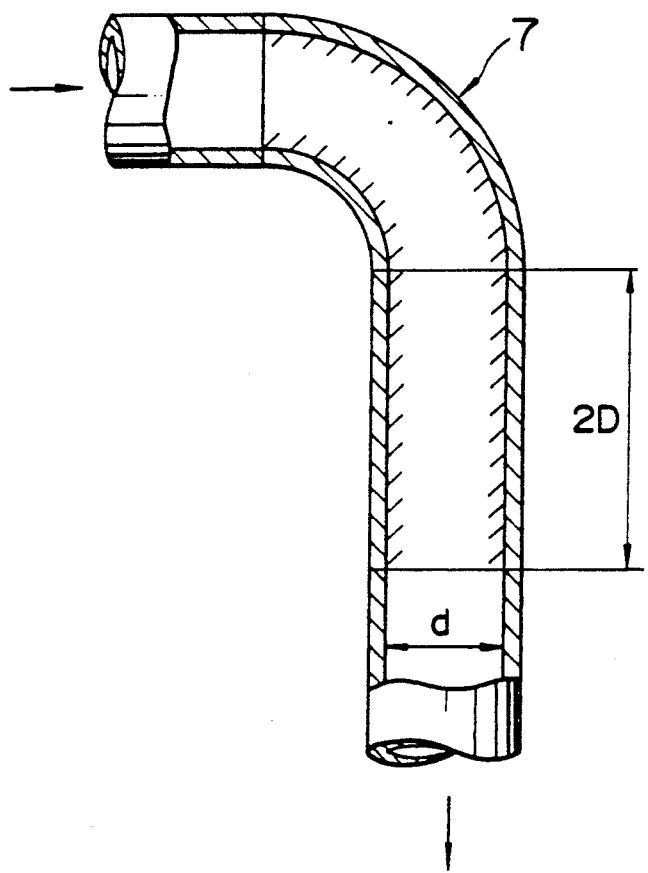
FIG. 1 is a cross-sectional view of an embodiment in which the present invention is applied to an elbow.

Diagrams of the embodiments are shown respectively for the case in which the present invention is applied to an elbow in FIG. 1, a branch pipe in FIG. 2 and a pipe disposed on the downstream side of a control valve in FIG. 3. In these drawings the hatched portions inside the pipes are where coating is applied according to the present invention. Reference numeral 6 indicates a control valve and 7 indicates piping.

The reduction of wall thickness due to erosion-corrosion in the piping made of carbon steel used in the wet steam system, the feedwater and condensate system, and the drain system of a thermal or nuclear power plant is significant in parts of the piping where a curved flow is formed, such as an elbow, a bend, a branch pipe, a junction pipe, and also in portions of straight pipes installed on the downstream side of a curved pipe and located within a length which is approximately twice the pipe caliber from the pipe, and further in pipes provided on the downstream side of the parts forming a restricted flow, such as a control valve and an orifice.

Therefore, to control development of thickness reductions due to erosion-corrosion in the piping for a new system to be built, it is effective and economical to form the coating of metal or ceramic of the present invention in advance only on the inner surface of various piping parts, such as those mentioned above, which are known to often undergo thickness reductions due to erosion-corrosion.

Also, as for parts which are already in an existing system, it is possible to control the further progress of thickness reduction by forming the coating of metal or ceramic of the present invention on the surface of such parts where the thickness reduction has already occured to some extent. This can be done at a low cost because the existing parts are used further and not replaced in their entirety.

According to the present invention, to the portions hatched inside the pipe walls in FIGS. 1 through 3, the following coatings, for example, are applied.

a) A lower layer coating of Ni—Cr and an upper layer coating of WC+(Ni—Cr) can be applied by means of atmospheric plasma thermal spraying. The lower layer coating of Ni—Cr has a thickness of 0.2 mm with a composition of Ni:Cr=80:20, and the upper layer coating of WC+(Ni—Cr) has a thickness of 0.4 mm with a composition of WC:Ni—Cr=1:2 (Ni:Cr=80:20).

b) A single layer coating of WC+Co or WC+(Ni—Cr) can be applied by means of jet kote thermal spraying. The single layer coating of WC+Co has a thickness of 0.15 mm with a composition of WC:Co 88:12. The single layer coating of WC+(Ni—Cr) has a thickness of 0.15 mm with a composition of WC:Ni—Cr=88:12 (Ni:Cr=80:20).

c) A coating of SUS 316 can be applied with a thickness of 0.4 mm.

Thickness reductions of the piping due to erosion-corrosion can be effectively prevented by forming any of the above-mentioned coatings.

Next, other embodiments in which the present invention is applied to various kinds of valves for a thermal or nuclear power plant will be described.

Figure 4:
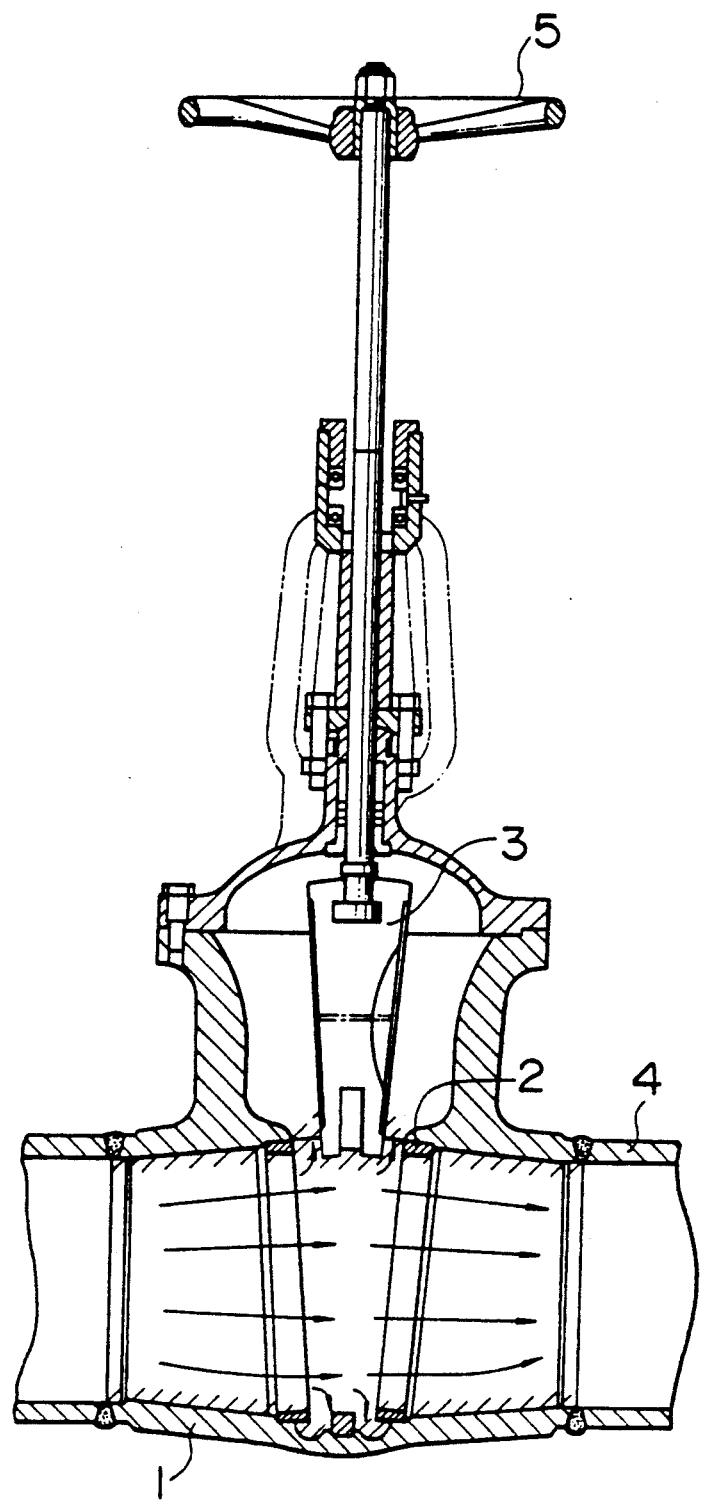
FIG. 4 is a cross-sectional view of an embodiment in which the present invention is applied to a gate valve.
Figure 5:
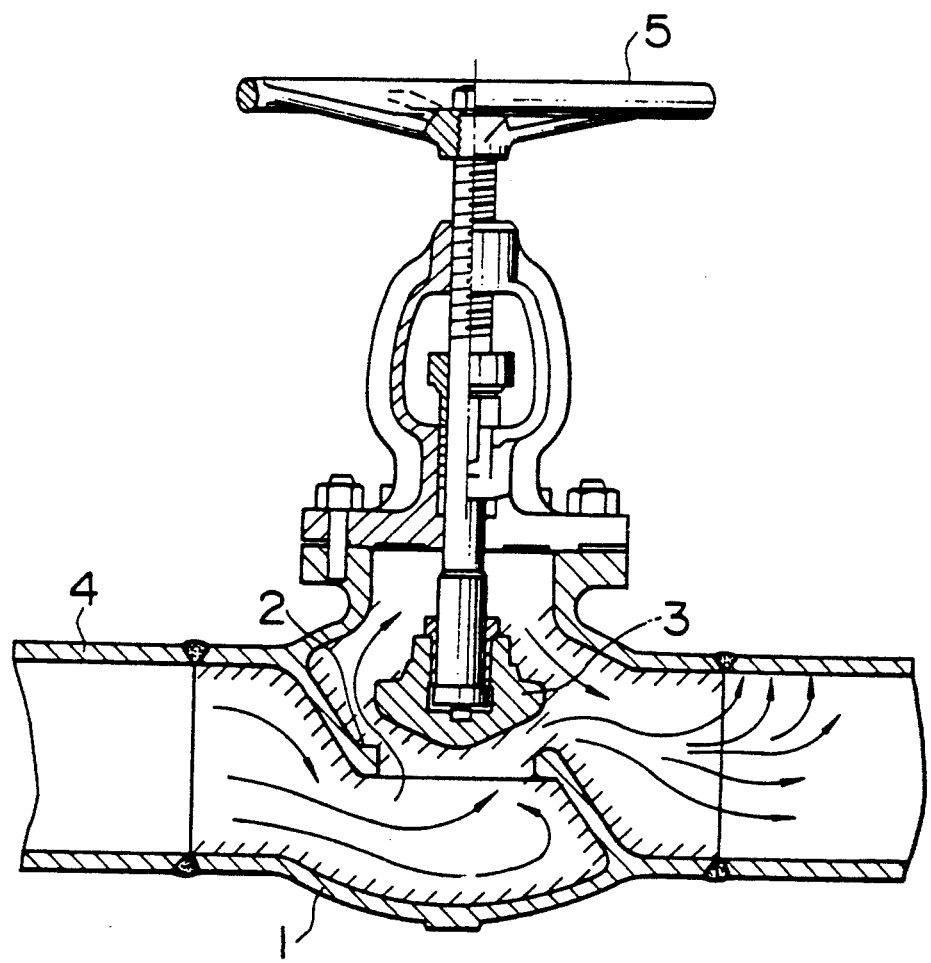
FIG. 5 is a cross-sectional view of an embodiment in which the present invention is applied to a globe valve.
Figure 6:
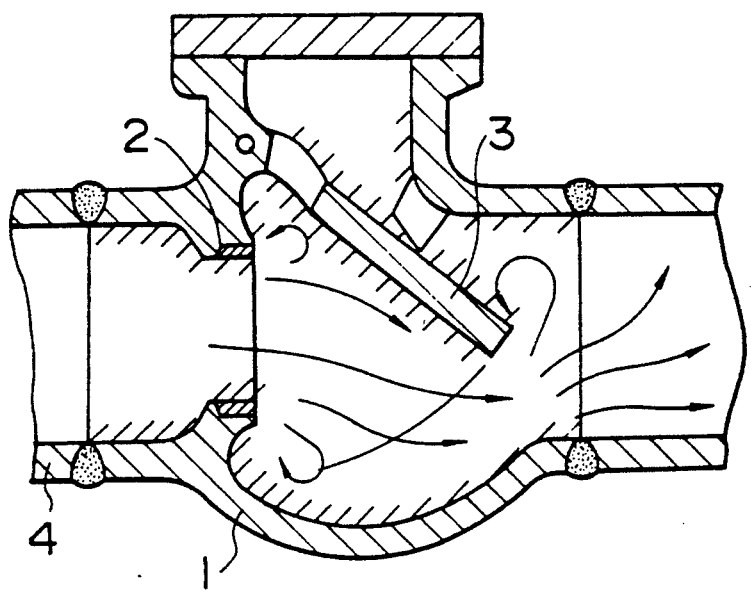
FIG. 6 is a cross-sectional view of an embodiment in which the present invention is applied to a check valve.

Diagrams of the embodiments are shown respectively for the case in which the present invention is applied to a gate valve in FIG. 4, a globe valve in FIG. 5, and a check valve in FIG. 6. In these drawings, the portions hatched inside the valve walls are where the coating of the present invention is applied.

In FIGS. 4 through 6, reference numeral 1 denotes a valve casing, 2 a valve seat, 3 a valving element, 4 a connecting pipe and 5 an operation handle of the valving element.

Additionally, when a coating is formed by thermal spraying according to the present invention, it is preferable to have the thermal spraying applied after finishing the assembly of parts by welding. For example, the welding of the valve casing 1 with the valve seat 2 and the welding of the valve casing 1 with the connecting pipe 5 correspond to this welding which should be done before spraying. This is to protect the coatings of metal or ceramic formed by spraying from being damaged by the heat during the welding.

On the portions of the valve casing 1 and the valving element 3 shown in FIGS. 4 to 6 marked with hatching, any coating of the embodiments described in connection with FIGS. 1 through 3 can be formed to obtain similar effects as those of the described embodiments.

We claim:

1. A protective coating for steel in at least part of a system constituting at least one of a wet steam system, a feedwater and condensate system, and a drain system of thermal and nuclear power plants, said system being exposed to a fluid flowing therein, said coating comprising:

a film layer of a material selected from the group consisting of a metal comprising a major component other than Fe and a ceramic, said material being formed on a surface of the system to be protected by a spraying technique selected from the group consisting of atmospheric plasma thermal spraying and high energy plasma thermal spraying so that said film layer is a boundary film chemically stable against said fluid flowing through said system and resistant against the efflux of $Fe^{2+}$ to prevent erosion-corrosion of said coated part of said system.

2. A coating as claimed in claim 1 comprising:
a lower layer coating on said steel of Ni—Cr; and
an upper layer coating of WC+(Ni—Cr), said coatings being formed by atmospheric plasma thermal spraying.

3. A coating as claimed in claim 1 comprising:
a single layer of elements selected from the group consisting of WC+Co and WC+(Ni—Cr) formed by means of jet kote plasma thermal spraying.

4. A coating as claimed in claim 1 wherein:
said fluid flowing in said system is deaerated pure water.

5. A coating as claimed in claim 2 wherein:
said fluid flowing in said system is deaerated pure water.

6. A coating as claimed in claim 3 wherein:
said fluid flowing in said system is deaerated pure water.

7. A coating as claimed in claim 1 wherein:
said fluid flowing in said system is deaerated pure water.

* * * * *

UNITED STATES PATENT AND TRADEMARK OFFICE
CERTIFICATE OF CORRECTION

PATENT NO. : 5,317,610
DATED      : May 31, 1994
INVENTOR(S): KITA et al.

It is certified that error appears in the above-identified patent and that said Letters Patent is hereby corrected as shown below:

On the title page, left column at [30], "Mar. 26, 1991 [JP] Japan ...... 3-61543" should read --Mar. 26, 1991 [JP] Japan ...... 3-61593--.

Signed and Sealed this

Thirtieth Day of August, 1994

Attest:

BRUCE LEHMAN

Attesting Officer

Commissioner of Patents and Trademarks